United States Patent [19]

Kusano et al.

[11] Patent Number: 5,225,751
[45] Date of Patent: Jul. 6, 1993

[54] POWER SUPPLY CIRCUIT FOR A MOTOR

[75] Inventors: Akihisa Kusano, Kawasaki; Izumi Narita, Koganei; Yuzo Seino, Kawasaki; Kaoru Sato; Tatsuto Tachibana, both of Yokohama; Tomohiro Nakamori, Machida, all of Japan

[73] Assignee: Canon Kabushiki Kaisha, Tokyo, Japan

[21] Appl. No.: 793,550

[22] Filed: Nov. 18, 1991

[30] Foreign Application Priority Data

Nov. 19, 1990 [JP] Japan .................. 2-313185

[51] Int. Cl.$^5$ .................. H02J 1/04; G05F 1/10
[52] U.S. Cl. .................. 318/434; 388/903; 361/31
[58] Field of Search ............ 318/434, 430, 431, 432; 388/903; 361/23, 30, 31

[56] References Cited

U.S. PATENT DOCUMENTS 4,814,687 3/1989 Walker .................. 323/275
4,819,117 4/1989 Brennan et al. .................. 361/18
5,117,167 5/1992 Kazmirski .................. 318/439

FOREIGN PATENT DOCUMENTS 59-191844 12/1984 Japan .

Primary Examiner—Bentsu Ro
Attorney, Agent, or Firm—Fitzpatrick, Cella, Harper & Scinto

[57] ABSTRACT

In a power supply circuit for a motor in which a power source line can be opened and closed by a first opening-closing device, a construction is adopted which has a electrically controllable second opening-closing device connected in parallel to the first opening-closing device, a comparator for comparing the voltage of the motor load side with a predetermined value, a controller for controlling the opening and closing of the second opening-closing device on the basis of a signal from the comparator, and a current limiter device provided in parallel to the second opening-closing device, whereby a rush current when the first opening-closing device is closed can be suppressed to thereby prevent the fluctuation of the source voltage and the deterioration of the contacts of the first opening-closing device.

4 Claims, 4 Drawing Sheets

POWER SUPPLY CIRCUIT FOR A MOTOR

BACKGROUND OF THE INVENTION

1. Field of the Invention

This invention relates to a power supply circuit for a motor in which a power source to a motor load can be opened and closed by a switch or the like.

2. Related Background Art

Generally, a motor used in a laser beam printer requires great power because it drives a driving system for a photosensitive drum and a paper conveying system.

A power supply circuit for a motor for driving such a laser beam printer has heretofore been such as is shown in FIG. 7 of the accompanying drawings.

In FIG. 7, the reference numeral 1 designates switch for closing and opening a power source, the reference numeral 2 denotes motor, a reference numeral 3 designates a motor drive circuit, and reference numeral 4 denotes a capacitor.

The switch 1 has, for example, the function of protecting the user, and is designed to be opened in response to the opening of the cover or the like of an apparatus such as a printer in which the motor 2 is used, and stops the power supply to the motor so that the user may not be injured even if he touches a gear or the like driven by the motor 2.

With such a power supply circuit, it is sometimes the case that when the motor 2 is driven with the switch 1 closed, a noise-like great current such a spike current flows, and because the power of a motor for LBP is large, a large ripple current flows and thus, in order to stabilize the source voltage, the capacitor 4 of large capacitance (e.g., several hundred $\mu F$) is provided near the drive circuit 3.

FIG. 8 of the accompanying drawings is a timing chart showing the fluctuating states of the supplied voltage $V_1$, capacitor current $i_c$ and source voltage (the reference value = +24V) when the switch 1 is opened and closed in the power supply circuit of FIG. 7.

Now, in the conventional power supply circuit as previously described, the capacitor 4 is provided immediately behind the switch 1 and therefore, there have been the following technical problems to be solved.

i) As shown by the capacitor current in the middle graph in FIG. 8, an excessive current flows during the closing of the switch and therefore, a spark sometimes flashes at the contacts of the switch 1 to cause burning, bad contact, or the like, of the contacts.

ii) By such excessive current during the closing of the switch, the source voltage sometimes momentarily varies during the closing of the switch as shown by the source voltage as shown in the bottom graph in FIG. 8, thereby adversely affecting other circuits.

Also, the overcurrent protecting function of the power source has sometimes been performed to shut down the power source.

On the other hand, a device in which to suppress such a current when an electronic unit is mounted on a power supply device comprises a switch circuit is provided between a power source and an electronic circuit in the electronic unit, and a current limiting circuit provided parallel to the switch circuit. During the mounting of the electronic unit, the power supply to the electronic circuit is effected through the current limiting circuit, and when it is detected by a voltage detecting circuit that the potential of the electronic circuit has reached a predetermined level, the power supply to the electronic circuit is effected through the switch circuit. Such a device is disclosed in Japanese Utility Model application Laid Open No. 59-191844.

However, it has not been known to use such a circuit for suppressing the rush current during the closing of the power source in a motor for driving a laser beam printer.

SUMMARY OF THE INVENTION

It is an object of the present invention to overcome the above-noted disadvantages and to enable the rush current when a main switch is closed in a power supply circuit for a motor for driving a laser beam printer to be suppressed.

It is another object of the present invention to gradually charge when the voltage of the motor side is below a predetermined value, and to rapidly charge through a constant current circuit when the voltage of the motor side has reached the predetermined value or greater.

It is still another object of the present invention is to determine the current limit value of a constant current in conformity with the voltage of the motor side.

Other objects of the present invention will become apparent from the following detailed description of some specific embodiments of the invention.

DETAILED DESCRIPTION OF THE PREFERRED EMBODIMENTS

Some embodiments of the present invention will hereinafter be described with reference to the drawings, but the power supply circuit for a motor according to each embodiment is a power supply circuit for the main motor of a laser beam printer, and this main motor is for driving the drive system of a photosensitive drum and a paper conveying system.

Figure 1:
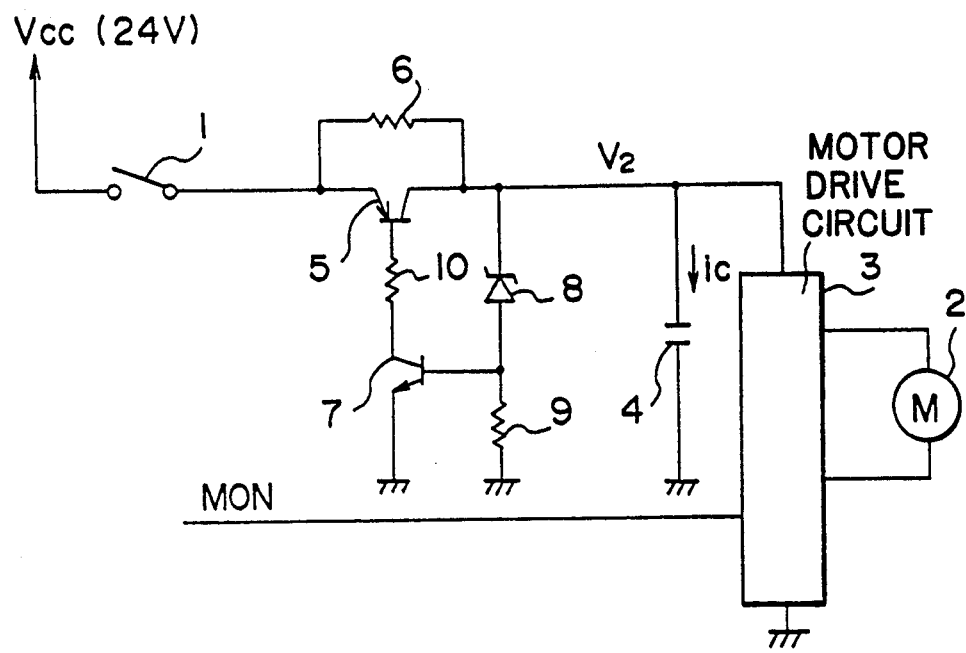
FIG. 1 is a circuit diagram of showing a first embodiment of a power supply circuit for a motor according to the present invention.
Figure 2:
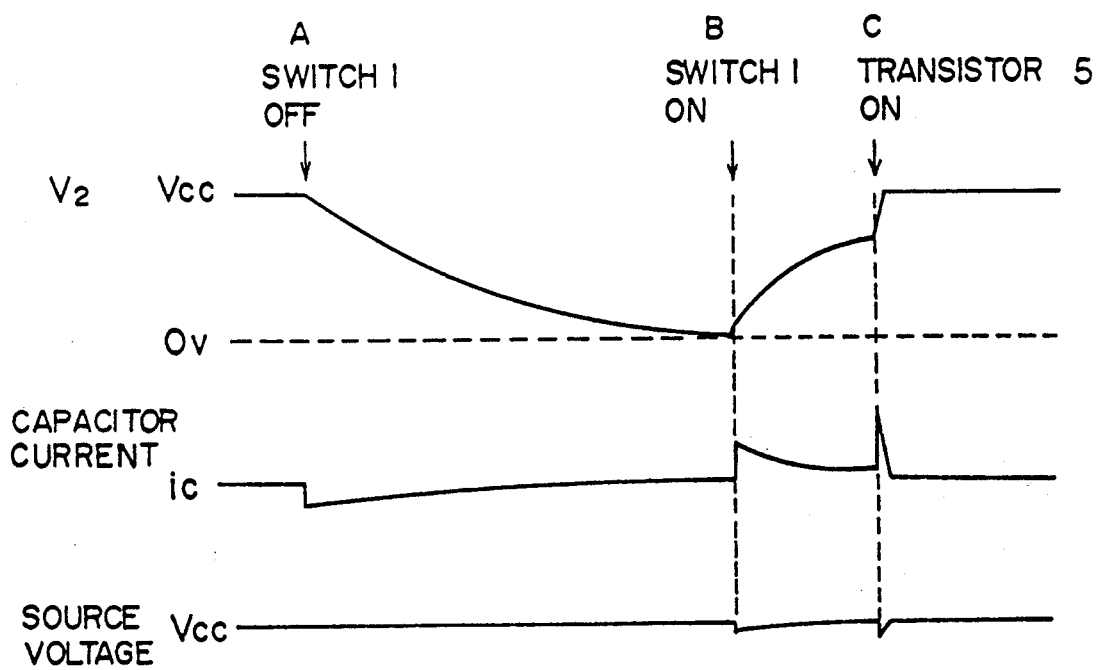
FIG. 2 is a timing chart showing the operation of the power supply circuit of FIG. 1.

FIGS. 1 and 2 show a first embodiment of the present invention, and more specifically, FIG. 1 diagrammatically shows a power supply circuit for the main motor of a laser beam printer, and FIG. 2 is a timing chart of the power supply circuit of FIG. 1.

In FIG. 1, the reference numeral 1 designates a switch forming first opening-closing means for switching on and off a power source, the reference numeral 2 denotes a motor to be supplied with electric power, the reference numeral 3 designates a motor drive circuit, the reference numeral 4 denotes a capacitor, the reference numeral 5 designates a transistor forming second opening-closing means, the reference numeral 6 denotes a resistor forming current limiting means, the reference numeral 7 designates a transistor, the reference numeral 8 denotes a Zener diode, and the reference numerals 9 and 10 designate resistors.

$V_2$ indicates a voltage applied (supplied) to the motor drive circuit 3 and the capacitor 4.

The switch 1, like the one according to the prior art, has, for example, the function of protecting the user, and can be designed to be opened in response to the opening of the cover or the like of an apparatus such as a printer in which the motor 2 is used so that the user may not be injured even if he touches a gear or the like driven by the motor 2, thereby stopping the power supply to the motor.

A circuit comprising the transistor 7, the Zener diode 8 and the resistors 9 and 10 constitute comparing means and control means.

FIG. 2 is a timing chart showing the fluctuating states of the supplied voltage $V_2$, capacitor current $i_c$ and source voltage (reference value = +24V) when the switch 1 is opened and closed in the power supply circuit of FIG. 1.

The operation of the power supply circuit of FIG. 1 will now be described with reference to FIG. 2.

When, at a point in time A, the switch (first opening-closing means) 1 is switched from its ON state to its OFF state, the voltage $V_2$ applied to the capacitor 4 is discharged toward 0 V (zero volt) through the Zener diode 8 and an internal resistor or the like in the motor drive circuit 3.

When the switch 1 is closed at a point in time B after the lapse of a certain time, a charging current flows to the capacitor 4 through the resistor 6 and the potential of the capacitor 4 rises gradually.

At this time, the transistor 5 is in its OFF state.

When the voltage $V_2$ of the capacitor 4 exceeds the Zener voltage of the Zener diode 8, the base current of the transistor 7 is supplied through the Zener diode 8 and the transistor 7 becomes turned on, and the transistor 5 also becomes turned on (a point of time C in FIG. 2).

When this state is brought about, the capacitor 4 is rapidly charged through the transistor 5.

Figure 7:
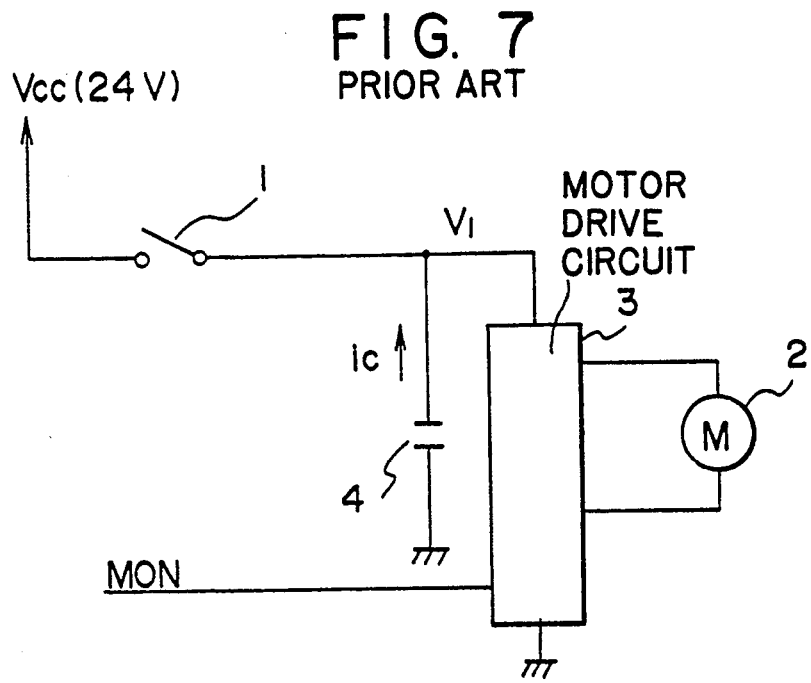
FIG. 7 is a circuit diagram showing an example of the construction of a power supply circuit for a motor according to the prior art.
Figure 8:
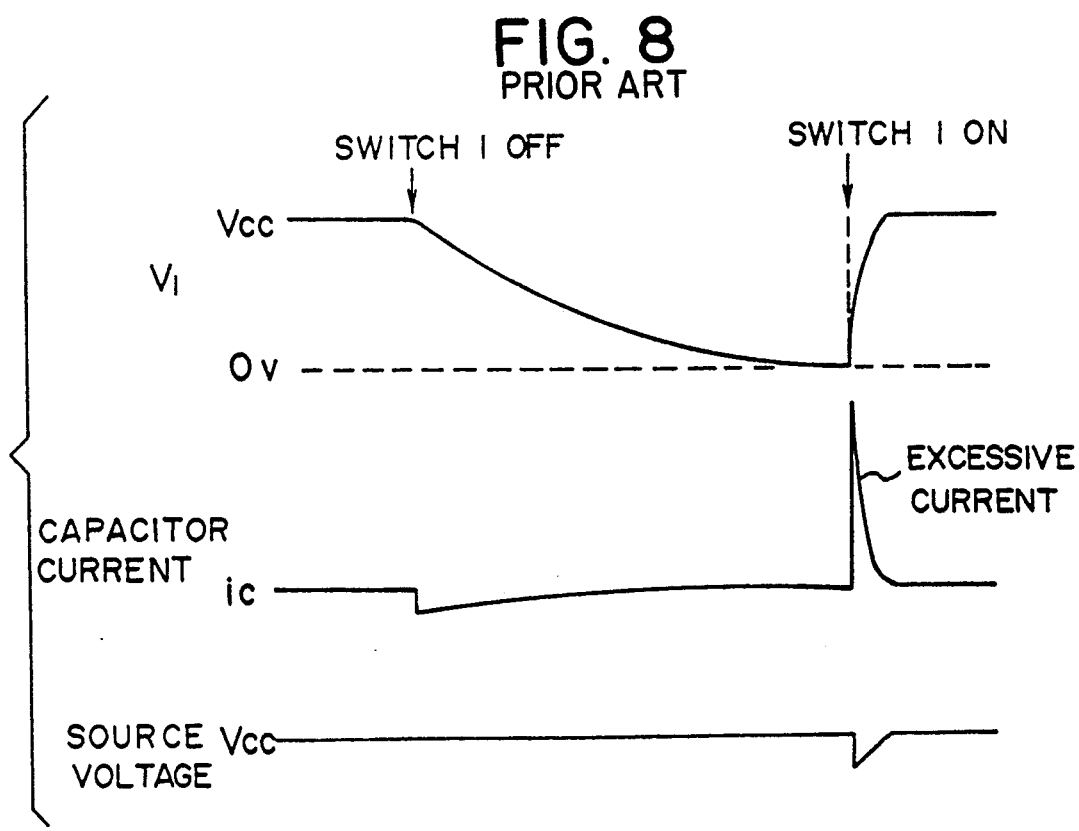
FIG. 8 is a timing chart showing the operation of the power supply circuit of FIG. 7.

At this time, a rush current flows to the capacitor 4, but the capacitor 4 is already charged to a considerable voltage at the point of time C in FIG. 2 and therefore, as compared with the case of the prior art shown in FIGS. 7 and 8, this rush current becomes very small.

Accordingly, the source voltage also hardly fluctuates.

Also, as regards the current suppressing resistor (current limiting means) 6 when the switch 1 is ON, the transistor 5 is short-circuited when the capacitor voltage $V_2$ is above a predetermined voltage and therefore, the impedance of the power source line when the motor 2 is being driven is small and accordingly, the source voltage will hardly be reduced even if a great current during the starting of the motor flows.

Further, the transistor 5 passes the electric current therethrough only in one direction and therefore, spiky noise such as counter electromotive voltage created by the motor 2 is not passed to the power source.

Thus, there is also the effect that the adverse effect of the motor noise upon other circuits can be suppressed.

Should the motor 2 be short-circuited, the transistor 5 will become turned off, and this also leads to the effect that an excessive current can be prevented from flowing to the transistor 5 to thereby cause burning.

In the present embodiment, it is necessary that from immediately after the first opening-closing means (switch) 1 has been closed, the capacitor 4 be charged to a predetermined voltage through the resistor 6 and therefore, it is necessary to control the device so that a MON signal (the input singal of the motor drive circuit) for driving the motor 2 may not be rendered true until $V_2$ rises to $V_{cc}$.

Figure 3:
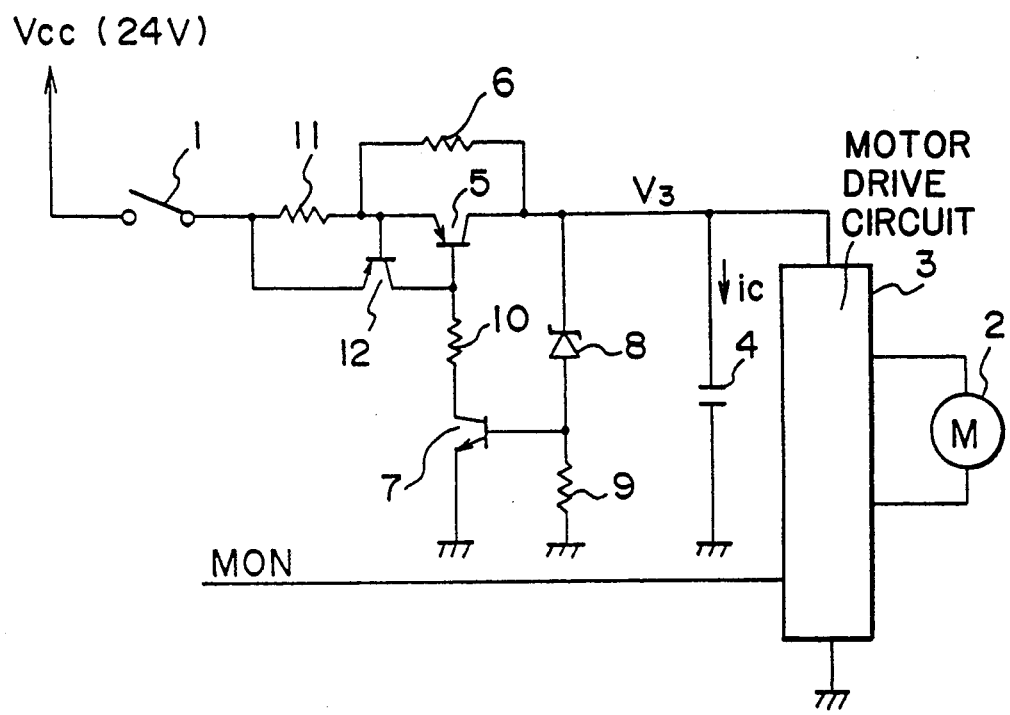
FIG. 3 is a circuit diagram showing a second embodiment of the power supply circuit for a motor according to the present invention.

FIG. 3 diagrammatically shows a power supply circuit for a motor according to a second embodiment of the present invention.

In FIG. 3, the reference numeral 1 designates a switch forming first opening-closing means for switching on and off a power source, the reference numeral 2 denotes a motor to the supplied with electric power, the reference numeral 3 designates a motor drive circuit, the reference numeral 4 denotes a capacitor, the reference numeral 5 designates a transistor forming second opening-closing means, the reference numeral 6 denotes a resistor forming current limiting means, the reference numeral 7 designates a transistor, the reference numeral 8 denotes a Zener diode, the reference numerals 9 and 10 designate resistors, the reference numeral 11 denotes a resistor for current detection, and the reference numeral 12 designates a transistor.

$V_3$ indicates a voltage applied (supplied) to the motor drive circuit 3 and the capacitor 4.

The switch 1, like that in the first embodiment, has, for example, the function of protecting the user, and can be designed to be opened in response to the opening of the cover or the like of an apparatus such as a printer in which the motor 2 is used so that the user may not be injured even if he touches a gear or the like driven by the motor 2, thereby stopping the pwoer supply to the motor.

Also, a circuit comprising the transistor 7, the Zener diode 8 and the resistors 9 and 10 constitutes comparing means and control means.

Further, the resistor 11 and the transistor 12, with the transistor 5, constitute a current limiting circuit of constant current.

The limit current value of this current limit circuit is given by VBE (base-emitter voltage) of the transistor 12 divided by the resistance value of the resistor 11.

Figure 4:
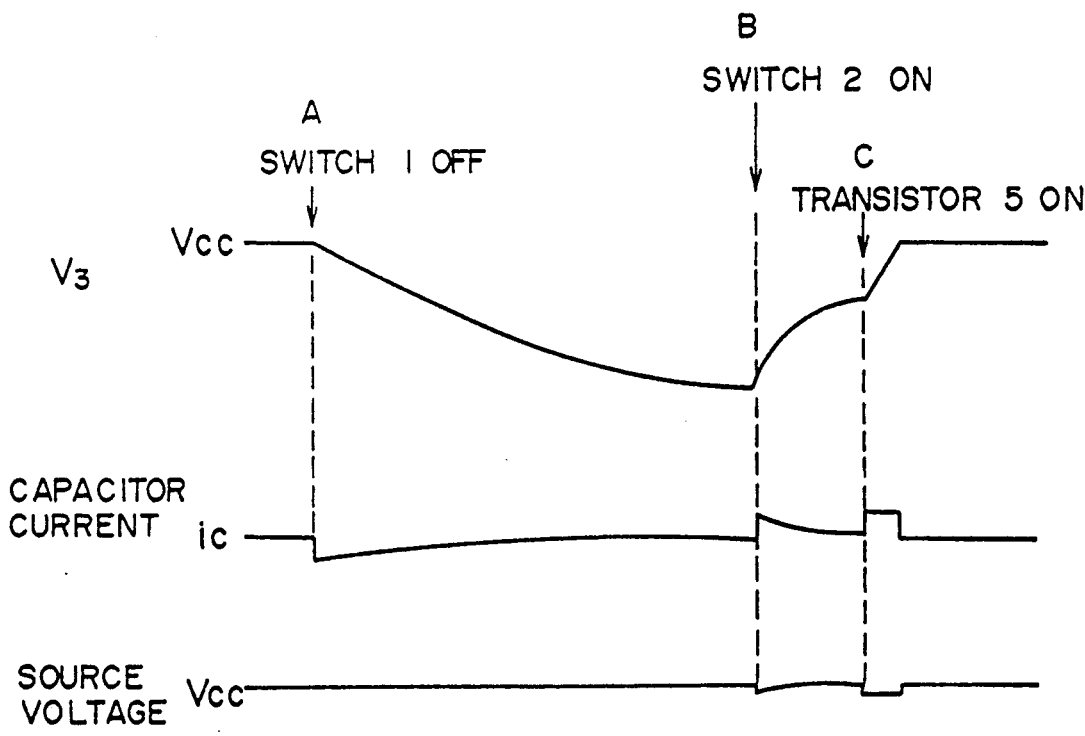
FIG. 4 is a timing chart showing the operation of the power supply circuit of FIG. 3.

FIG. 4 is a timing chart showing the fluctuating states of the supplied voltage $V_3$, capacitor current $i_c$ and source voltage (the reference value = +26V) when the switch 1 is opened and closed in the power supply circuit of FIG. 3.

The operation of the power supply circuit of FIG. 3 will now be described with reference to FIG. 4.

When, at a point in time A, the switch (first opening-closing means) 1 is switched from its ON state to its OFF state, the voltage $V_3$ applied to the capacitor 4 is discharged toward 0 V (zero volt) through the Zener diode 8 and an internal resistor or the like in the motor drive circuit 3.

When, the switch 1 is closed at a point in time B, after the lapse of a certain time, a charging current flows to the capacitor 4 through the resistor 6 and the potential of the capacitor 4 rises gradually.

At this time, the transistor 5 is in its OFF state.

When the voltage $V_3$ of the capacitor 4 exceeds the Zener voltage of the Zener diode 8, the base current of the transistor 7 is supplied through the Zener diode 8 and the transistor 7 becomes turned on, and the transistor 5 also becomes turned on (a point of time C in FIG. 4).

When this state is brought about, the capacitor 4 is rapidly charged through the transistor 5.

At this time, a rush current flows to the capacitor 4, but the capacitor 4 is already charged to a considerable voltage at the point of time C in FIG. 4 and therefore, as compared with the case of the prior art shown in FIGS. 7 and 8, this rush current is very small.

Accordingly, the source voltage also hardly fluctuates.

Also, as regards the current suppressing resistor (current limiting means) 6 when the switch 1 is ON, the transistor 5 is short-circuited when the capacitor voltage $V_3$ is above a predetermined voltage and therefore, the impedance of the power source line when the motor 2 is being driven is small and accordingly, the source voltage will hardly be reduced even if a large current, during the starting of the motor, flows.

Further, the transistor 5 passes an electric current therethrough only in one direction and therefore, spiky noise such as counter electromotive voltage created by the motor 2 is not passed to the power source.

Thus, there is also the effect that the adverse effect of the motor noise upon other circuits can be suppressed.

Should the motor 2 be short-circuited, the transistor 5 will become turned off and therefore, there is also the effect that an excessive current can be prevented from flowing to the transistor 5 to thereby cause burning.

In the first embodiment, when the transistor 5 becomes turned on (the point of time c), a transient current like the capacitor current $i_c$ in FIG. 2 flows, while according to the present embodiment, the capacitor is clamped by a predetermined current like the capacitor current $i_c$ in FIG. 4 and therefore, the source voltage can be further stabilized.

Also, generally, when the collector voltage when the transistor 5 becomes turned on, is large, the largest collector current flows and the electric power momentarily becomes large, but according to the present embodiment, only a collector current of a predetermined value flows and therefore, the momentary electric power of the transistor 5 can also be suppressed low.

Thus, according to the present embodiment, the effect of suppressing the rush current when the first opening-closing means (switch) 1 is closed becomes larger than in the case of the aforedescribed first embodiment.

Figure 5:
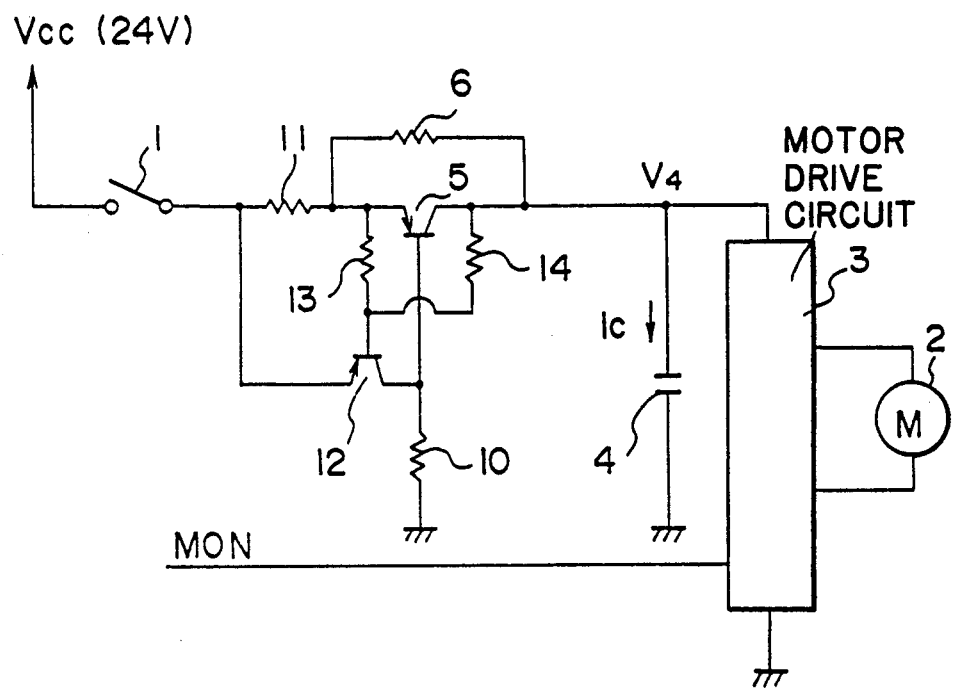
FIG. 5 is a circuit diagram showing a third embodiment of the power supply circuit for a motor according to the present invention.

FIG. 5 diagrammatically shows a power supply circuit for a motor according to a third embodiment of the present invention.

In FIG. 5, the reference numeral 1 designates a switch forming first opening-closing means for switching on and off a power source, the reference numeral 2 denotes a motor to be supplied with electric power, the reference numeral 3 designates a motor drive circuit, the reference numeral 4 denotes a capacitor, the reference numeral 5 designates a transistor forming second opening-closing means, the reference numeral 6 denotes a resistor forming current limiting means, the reference numeral 10 designates a resistor, the reference numeral 11 denotes a resistor for current detection, the reference numeral 12 designates a transistor, and the reference numerals 13 and 14 denote resistors.

$V_4$ indicates a voltage applied (supplied) to the motor drive circuit 3 and the capacitor 4.

The switch 1, like that in the first embodiment, has, for example, the function of protecting the user, and can be designed to be opened in response to the opening of the cover or the like of an apparatus such as a printer in which the motor 2 is used so that the user may not be injured even if he touches a gear or the like driven by the motor 2, thereby stopping the power supply to the motor.

In the present embodiment, a current limiting circuit of constant current is constituted by the transistors 5 and 12 and the resistors 11 and 13, and the following two functions are added by adding the resistor 14.

i) Varying the limit current value of the current limiting circuit in conformity with the magnitude of the voltage $V_4$.

That is, the limit current value is varied on the basis of the following equation so that when the voltage $V_4$ is small, the limit current value may become small and when the voltage $V_4$ is great, the limit current value may become great.

$$\text{Limit current value} = \frac{V_{BE} - R_{13}/R_{14}(V_{CC} - V_{BE} - V_4)}{R_{11}},$$

where $V_{BE}$ represents the base-emitter voltage (e.g. of the order of 0.6 V) of the transistor 12, $V_{CC}$ represents the source voltage, and $R_{11}$, $R_{13}$ and $R_{14}$ represent the resistance values of the resistors 11, 13 and 14, respectively.

ii) As is apparent from the above equation, when $$V_4 < V_{CC} - \frac{R_{13} + R_{14}}{R_{13}},$$

the limit current value becomes equal to 0 and the transistor 5 becomes turned off.

Figure 6:
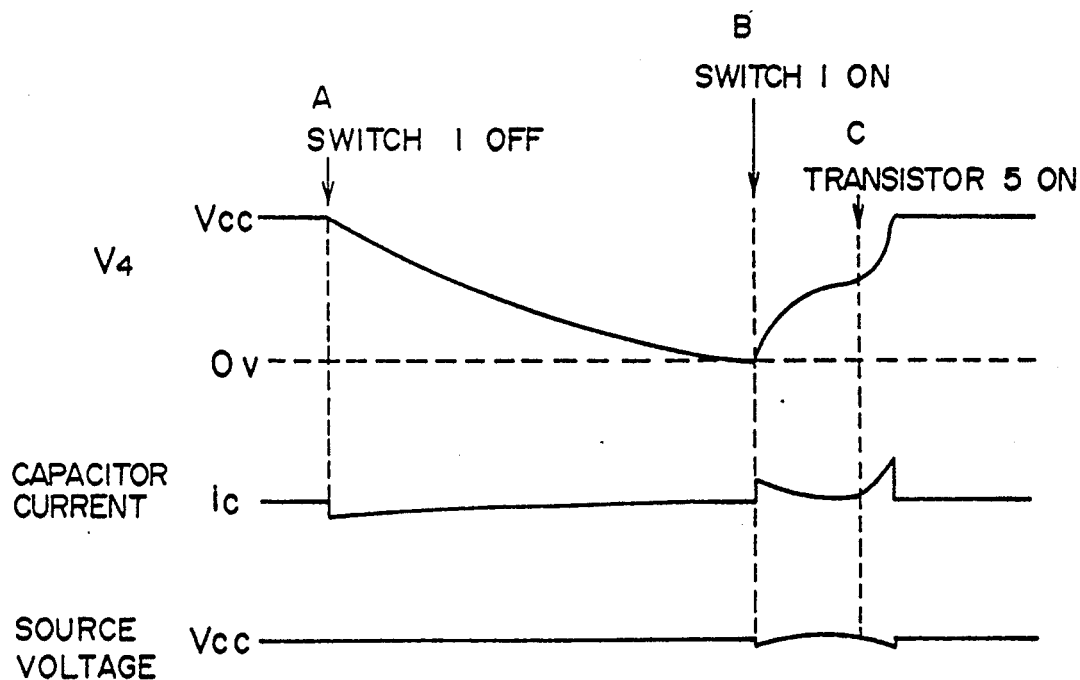
FIG. 6 is a timing chart showing the operation of the power supply circuit of FIG. 5.

FIG. 6 is a timing chart showing the fluctuating states of the supplied voltage $V_4$, capacitor current $i_c$ and source voltage (the reference value = +24V) when the switch 1 is opened and closed in the power supply circuit of FIG. 5.

The operation of the power supply circuit of FIG. 5 will now be described with reference to FIG. 6.

When, at a point in time A, the switch (first opening-closing means) 1 is switched from its ON state to its OFF state, the voltage $V_4$ applied to the capacitor 4 drops toward 0 V (zero volt).

When the switch 1 is closed when the voltage $V_4$ becomes 0 V (zero volt)(a point of time B), the capacitor 4 is charged through the resistor 6 and the voltage $V_4$ rises gradually as shown in FIG. 6.

At this time, the transistor 5 is in its OFF state and the transistor 12 is in its ON state.

When the voltage $V_4$ of the capacitor 4 exceeds a predetermined value, at a point of time C, the transistor (second opening-closing means) 5 becomes turned on and the transistor 12 becomes turned off. When this state is brought about, the capacitor 4 is charged through the transistor 5.

According to the present embodiment, the following operational effect is obtained in addition to effects similar to those of each of the aforedescribed embodiment.

When as shown by the capacitor current $i_c$ in FIG. 6, the voltage $V_4$ exceeds the predetermined value, the electric current initially increases with a slow rise, and the circuit operates so that a larger current may flow as the voltage $V_4$ becomes larger.

The present embodiment is the same as the aforedescribed embodiments in that the excessive current flowing to the capacitor 4 when the switch 1 is closed can be suppressed, but the present embodiment has, in addition to it, the effect that the momentary electric power consumed by the transistor 5 from after at the point in time C, this transistor has become turned on until the voltage $V_4$, rises to the source voltage $V_{CC}$, can be made smaller.

This is because of the fact that the limit current value of the transistor 5 becomes small when the voltage $V_4$ is low, means that when $V_{CE}$ (collector-emitter voltage) of the transistor 5 is larger, the collector current becomes small and when $V_{CE}$ becomes small, the collector current becomes great and therefore the circuit operates so as not to make the collector loss great.

By this, it has become possible to suppress the peak of the momentary electric power of the transistor 5 more than in the case of the second embodiment in which the limit current value is constant.

As is apparent from the foregoing description, in a power supply circuit for a motor wherein the power source line can be opened and closed by first opening-closing means, a construction is adopted which has electrically controllable second opening-closing means connected in series with said first opening-closing means, comparing means for comparing the voltage of the motor load side with a predetermined value, control means for controlling the opening and closing of the second opening-closing means on the basis of a signal from the comparing means, and current limiting means provided in parallel to the second opening-closing means and therefore, there is provided a power supply circuit for a motor in which the rush current when the first opening-closing means is closed can be suppressed to thereby prevent the fluctuation of the source votlage and the deterioration of the contacts of the first opening-closing means and also the transmission of noise created by the motor to the power source side can be decreased.

What is claimed is:

1. A power supply circuit for a motor including:
   first switch means for opening and closing a power source line;
   a motor supplied with electric power by the conduction of said first switch means;
   a drive circuit for driving said motor;
   a capacitor connected in parallel to said drive circuit;
   second switch means connected between said capacitor and said first switch means;
   current limiting means connected in parallel to said second switch means, said current limiting means being a charging path for charging said capacitor when said first switch means conducts;
   a constant current circuit for limiting the current to said capacitor, said constant current circuit having its current limit value varied in response to the voltage of said capacitor; and
   control means for controlling the opening and closing of said second switch means, said control means rendering said second switch means conductive when the voltage of said capacitor reaches a predetermined value, whereby a charging path to said capacitor is formed through said second switch means.

2. A power supply circuit according to claim 1, wherein said second switch means is a first transistor, said constant current circuit comprises a second transistor, a current detection resistor, and said first transistor.

3. A power supply circuit according to claim 2, wherein said control means comprises a resistor, said resistor is connected to said constant current circuit, whereby the current limit value of the constant current circuit is varied in response to the voltage of said capacitor.

4. A power supply circuit for a drive motor for a laser beam printer including:
   first switch means for opening and closing a power source line, said first switch means being switch-operated in response to the opening-closing of the cover of the printer;
   a motor for driving the drive system of the printer;
   a drive circuit for driving said motor;
   a capacitor connected in parallel to said drive circuit;
   second switch means connected between said capacitor and said first switch means;
   current limiting means connected in parallel to said second switch means, said current limiting means being a charging path for charging said capacitor when said first switch means conducts;
   comparing means for comparing the charging voltage of said capacitor with a predetermined value, said comparing means being adapted to output a comparison signal when the charging voltage of said capacitor exceeds said predetermined value; and
   control means for controlling the opening and closing of said second switch means, said control means rendering said second switch means conductive when said comparing means outputs the comparison signal, whereby a charging path to said capacitor is formed through said second switch means, wherein said second switch means is a first transistor which, together with a second transistor and a current detection resistor, comprises a constant current circuit.

* * * * *

UNITED STATES PATENT AND TRADEMARK OFFICE
CERTIFICATE OF CORRECTION

PATENT NO. : 5,225,751
DATED : July 6, 1993
INVENTOR(S) : KUSANO ET AL.

It is certified that error appears in the above-indentified patent and that said Letters Patent is hereby corrected as shown below:

Column 1

Line 61, delete "is".

Column 2

Line 21, delete "is".

Column 4

Line 10, change "singal" to --signal--.
Line 38, change "pwoer" to --power--.

Column 7

Line 6, delete "at".
Line 13, change "larger," to --large,--.
Line 15, change "great" to --large--.

Signed and Sealed this

Third Day of May, 1994

Attest:

BRUCE LEHMAN

*Attesting Officer*    *Commissioner of Patents and Trademarks*